(12) United States Patent
Mathison

(10) Patent No.: US 10,627,797 B2
(45) Date of Patent: Apr. 21, 2020

(54) SYSTEM AND METHOD FOR REMOTE CLOUD CONTROL OF HYDROGEN FUELING STATIONS

(71) Applicant: Honda Motor Co., Ltd., Tokyo (JP)

(72) Inventor: Steven R. Mathison, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 218 days.

(21) Appl. No.: 14/932,000

(22) Filed: Nov. 4, 2015

(65) Prior Publication Data
US 2017/0123400 A1 May 4, 2017

(51) Int. Cl.
G05B 19/05 (2006.01)

(52) U.S. Cl.
CPC .... *G05B 19/05* (2013.01); *G05B 2219/32413* (2013.01)

(58) Field of Classification Search
CPC ....................................... G05B 19/05
See application file for complete search history.

(56) References Cited

U.S. PATENT DOCUMENTS

| | | | |
|---|---|---|---|
| 7,444,189 B1 | 10/2008 | Marhoefer | |
| 2002/0132144 A1 | 9/2002 | McArthur et al. | |
| 2004/0163731 A1 | 8/2004 | Eichellberger et al. | |
| 2004/0205032 A1 | 10/2004 | Routtenberg et al. | |
| 2005/0000802 A1 | 1/2005 | Hobbs | |
| 2006/0118175 A1* | 6/2006 | Mathison | B60K 15/00 137/256 |
| 2006/0136099 A1* | 6/2006 | Hajiaghajani | C01B 3/34 700/272 |
| 2007/0144605 A1 | 6/2007 | Horowitz et al. | |
| 2007/0169837 A1* | 7/2007 | Cohen | B01F 3/028 141/102 |
| 2009/0058097 A1 | 3/2009 | Ovobe et al. | |
| 2010/0164287 A1* | 7/2010 | Komazawa | B60L 11/14 307/44 |
| 2011/0259469 A1* | 10/2011 | Harty | F17C 5/007 141/4 |
| 2013/0268130 A1* | 10/2013 | Adler | F17C 5/007 700/283 |
| 2014/0191030 A1 | 7/2014 | Reineccius | |
| 2014/0216599 A1* | 8/2014 | Loewenthal | F17C 5/00 141/4 |

(Continued)

FOREIGN PATENT DOCUMENTS

| | | |
|---|---|---|
| JP | 2002216296 | 8/2002 |
| WO | 2011060953 | 5/2011 |

*Primary Examiner* — Tejal Gami
(74) *Attorney, Agent, or Firm* — Rankin, Hill & Clark LLP

(57) ABSTRACT

A computer-implemented method and system for remote control of a hydrogen filling station includes providing a remote server operatively connected for computer communication via a communication network to a programmable logic controller (PLC). The PLC is configured to execute a control logic at the hydrogen filling station to control vehicle fueling. The method includes receiving at least one input parameter from the PLC at the remote server and generating by a processor at the remote server an updated control logic based on at least the input parameter. The method includes transmitting the updated control logic to the PLC for execution by the PLC at the hydrogen filling station to control vehicle fueling.

17 Claims, 4 Drawing Sheets

(56) References Cited

U.S. PATENT DOCUMENTS

2014/0263419 A1* 9/2014 Mathison ................. B67D 7/80
 222/3
2017/0074707 A1* 3/2017 Mathison ................ G01F 22/00

* cited by examiner

SYSTEM AND METHOD FOR REMOTE CLOUD CONTROL OF HYDROGEN FUELING STATIONS

BACKGROUND

The accuracy of hydrogen tank refueling is an important consideration for successfully providing short fueling times over a wide range of temperatures. As standards and methods for hydrogen tank refueling are developed across different platforms, management of these standards and methods at individual hydrogen tank refueling stations is critical to ensure accuracy. Hydrogen tank refueling stations include logic for controlling tank refueling and can be programmed directly on an individual basis. However, maintenance of logic programmed directly to a hydrogen tank refueling station is difficult to maintain while ensuring the correct standards and methods are implemented.

BRIEF DESCRIPTION

According to one aspect, a computer-implemented method for remote control of a hydrogen filling station includes providing a remote server operatively connected for computer communication via a communication network to a programmable logic controller (PLC). The PLC is configured to execute a control logic at the hydrogen filling station to control vehicle fueling. The method includes receiving at least one input parameter from the PLC at the remote server and generating by a processor at the remote server an updated control logic based on at least the input parameter. The method includes transmitting the updated control logic to the PLC for execution by the PLC at the hydrogen filling station to control vehicle fueling.

According to another aspect, a cloud computing-based system includes a hydrogen filling station transmitting at least one input parameter to a remote server via a communication network. The hydrogen filling station includes a programmable logic controller (PLC) for executing a control logic to control fueling of a vehicle. The remote server includes a processor and receives the at least one input parameter. The remote server generates, by the processor, an updated control logic based on the at least one input parameter and transmits the updated control logic to the hydrogen filling station for execution by the PLC to control fueling of the vehicle.

According to a further aspect, a hydrogen filling station for fueling a vehicle includes a programmable logic controller (PLC) including a control logic. The PLC executes the control logic to control fueling of the vehicle. The hydrogen filling station includes a plurality of sensors that provide measured values associated with a tank system of the vehicle receiving fuel and the hydrogen filling station supplying the fuel. The PLC transmits at least one of the measured values to a remote server via a communication network and the PLC receives at least one output parameter from the remote server. The PLC updates the control logic with the at least one output parameter.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
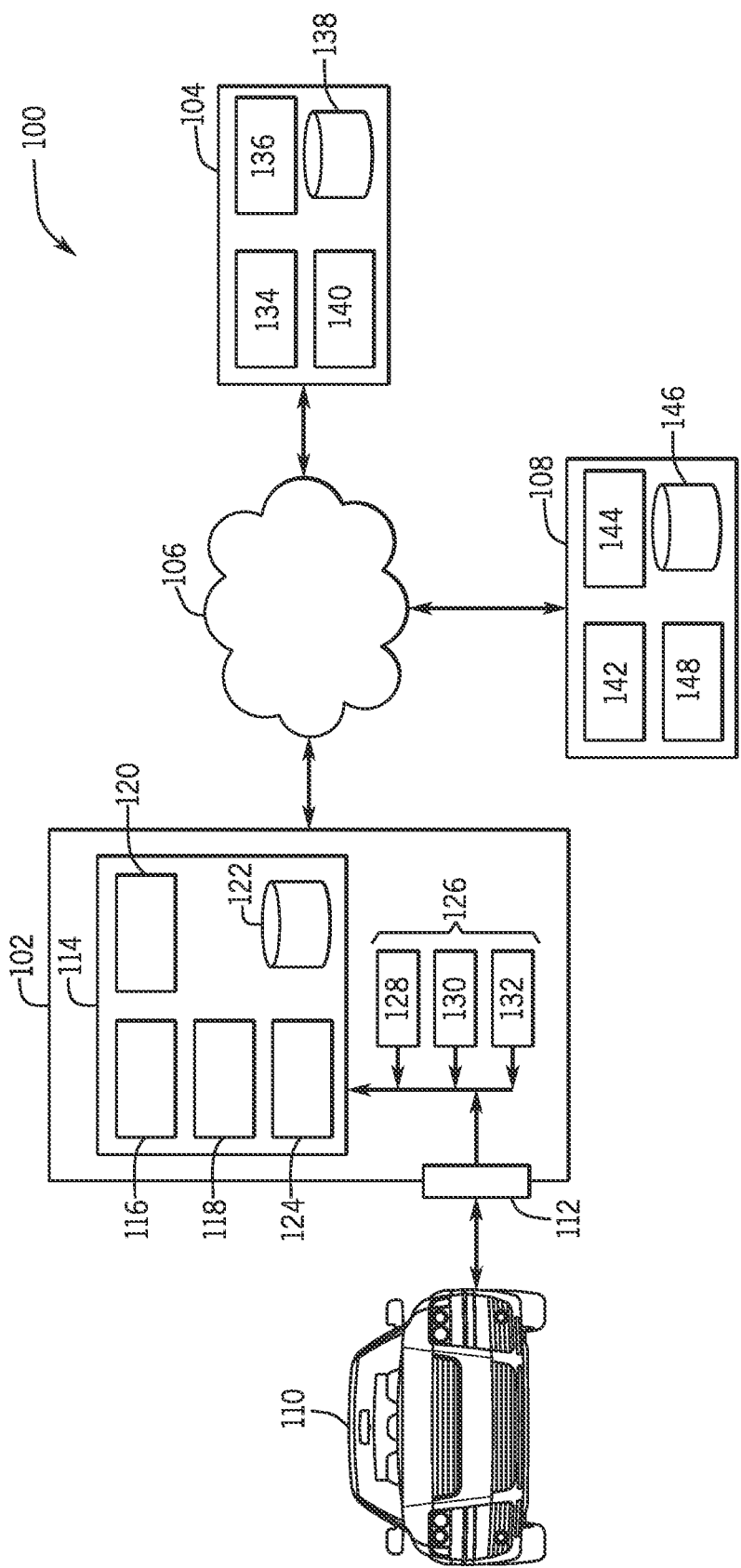
FIG. 1 is a schematic diagram of an exemplary cloud computing-based system for remote control of a hydrogen filling station according to an exemplary embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores (e.g., disks) and/or methods for accessing and/or manipulating those data stores.

"Logic", as used herein, includes but is not limited to hardware, firmware, a non-transitory computer readable medium that stores instructions, and/or combinations of each to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

A "memory", as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

A "processor", as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multi-core processors and co-processors and other multiple single and multicore processor and co-processor architectures. The processor can include various modules to execute various functions.

Referring now to the drawings, wherein the showings are for purposes of illustrating one or more exemplary embodiments and not for purposes of limiting same, FIG. 1 is a schematic diagram of an exemplary cloud computing-based system for remote control of a hydrogen filling station according to an exemplary embodiment. The components FIG. 1, as well as the components of other systems, hardware architectures, and software architectures discussed herein, can be combined, omitted, or organized into different architectures for various embodiments.

The cloud computing-based system 100 shown in FIG. 1 includes a hydrogen filling station 102 and a remote server 104 which are operatively connected for computer communication via a communication network 106. Additionally, in some embodiments, a third-party server 108 can be operatively connected for computer communication via the communication network 106 to the hydrogen filling station 102 and/or the remote server 104. Each of these components will now be discussed in more detail.

The hydrogen filling station 102 provides and controls fueling of a vehicle 110. The vehicle 110 connects to the hydrogen filling station 102 for fueling via a fueling interface 112. The fueling interface 112 can include components such as hydrogen flow regulator, a dispenser, a hose and, nozzle which couple to the vehicle 110, for example, to a vehicle gas tank (not shown). To implement fueling control, the hydrogen filling station 102 includes a programmable logic controller (PLC) 114 for executing a control logic 116 to control fueling of the vehicle 110. The control logic 116 (e.g., hardware, non-transitory computer-readable medium, firmware) can be configured for operating the hydrogen filling station 102 and controlling fueling of the vehicle 110. In particular, the PLC 114 provides the control logic 116 for operation of the hydrogen filling station 102 and can transmit a signal to the fueling interface 112 to control fueling. The control logic 116 can also provide hardware, non-transitory computer-readable medium that stores executable instructions, and/or firmware, for performing the methods and processes discussed herein. More specifically, the control logic 116 can provide fueling methods, algorithms, and protocols for operating the hydrogen filling station 102 and controlling fueling of the vehicle 110. Exemplary methods, algorithms, and protocols include, but are not limited to, MC Fill method, SAE look-up tables, SAE TIR J2601 protocols and parameters.

The PLC 114 can also include other computing components, for example, a processor 118, a memory 120, a data store 122, and a communication interface 124. The processor 118 can facilitate execution and calculation of functions of the control logic 116. The hardware, non-transitory computer-readable medium, firmware, discussed above, can be implemented as an ASIC programmed to perform hydrogen fueling and/or as stored computer executable instructions that can be stored in the memory 120, the data store 122 and then executed by PLC 114 and/or the processor 118. The communication interface 124 can include input/output devices and/or interfaces to communicate with the components of the hydrogen filling station 102 and the communication network 106. In some embodiments, the PLC 114 can include one or more buses (not shown) for communication with various devices, logics, and peripherals.

Further, the PLC 114 can include a plurality of sensors 126 that provide measured values associated with the hydrogen filling station 102, the vehicle 110, and/or a tank system (not shown) of the vehicle 110. The plurality of sensors 126 can include, but are not limited to, a pressure sensor 128, a temperature sensor 130, and an ambient temperature sensor 132. The pressure sensor 128, the temperature sensor 130, and the ambient temperature sensor 132 are used to control the operation of the hydrogen filling station 102. More specifically, the measured values provided by said sensors can be used as inputs to the PLC 114 and used by the control logic 116 to control the operation of the hydrogen filling station 102 and ultimately to control fueling of the vehicle 110.

As discussed above, the hydrogen filling station 102 is operatively connected for computer communication via the communication network 106 to the remote server 104. The remote server 104 can be a cloud server. Further, the remote server can be and/or function as a programming device for the PLC 114. Similar to the PLC 114, the remote server 104 can also include a processor 134, a memory 136, a data store 138, and communication interface 140.

As also discussed above, the system 100 includes the third-party server 108. The third-party server is operatively connected for computer communication via the communication network 106 to the remote server 104 and/or the hydrogen filling station 102. In some embodiments, the remote server 104 and/or the third-party server 108 are provided by an original equipment manufacturer (OEM). The remote server 104 and/or the third-party server 108 can include compliance information, rules set, algorithms, protocols, and methods (not shown) for controlling fueling of a vehicle. Similar to the PLC 114 and the remote server 104, the third-party server can also include a processor 142, a memory 144, a data store 146, and communication interface 148.

It is understood that the system 100 operates in a network environment facilitated by the communication network 106. The components of the system 100 can be connected to the communication network 106 via the communication interfaces 124, 140, and 148. Further, other remote computers and/or devices not shown in FIG. 1 can be logically connected to the components of the system 100 by the communication network 106.

Figure 2:
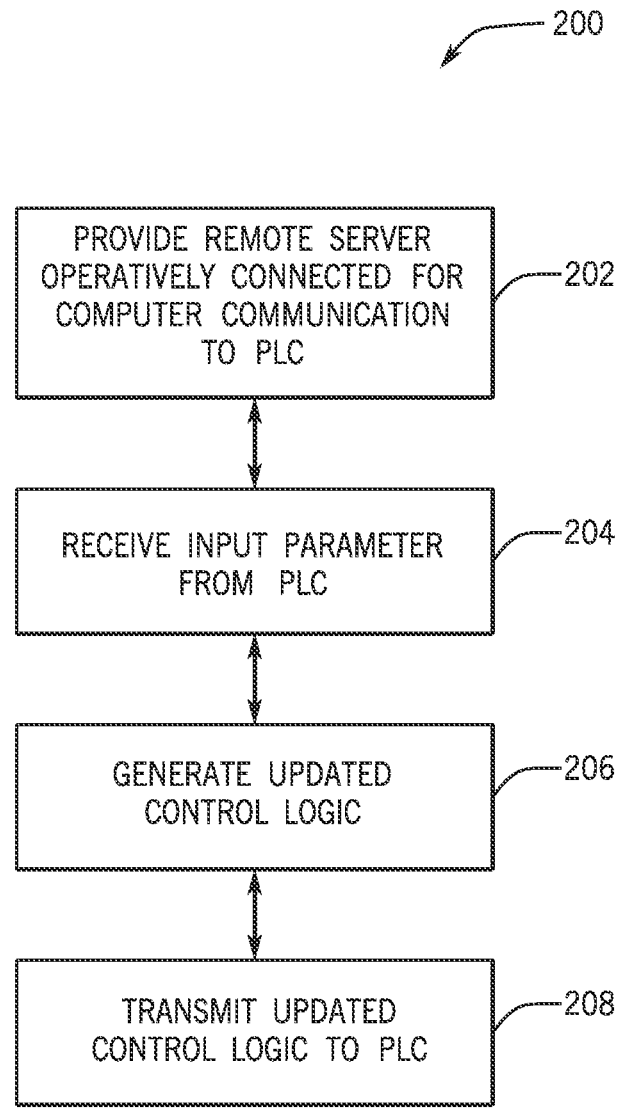
FIG. 2 is a flow diagram of an exemplary method for remote control of a hydrogen filling station according to an exemplary embodiment.
Figure 3:
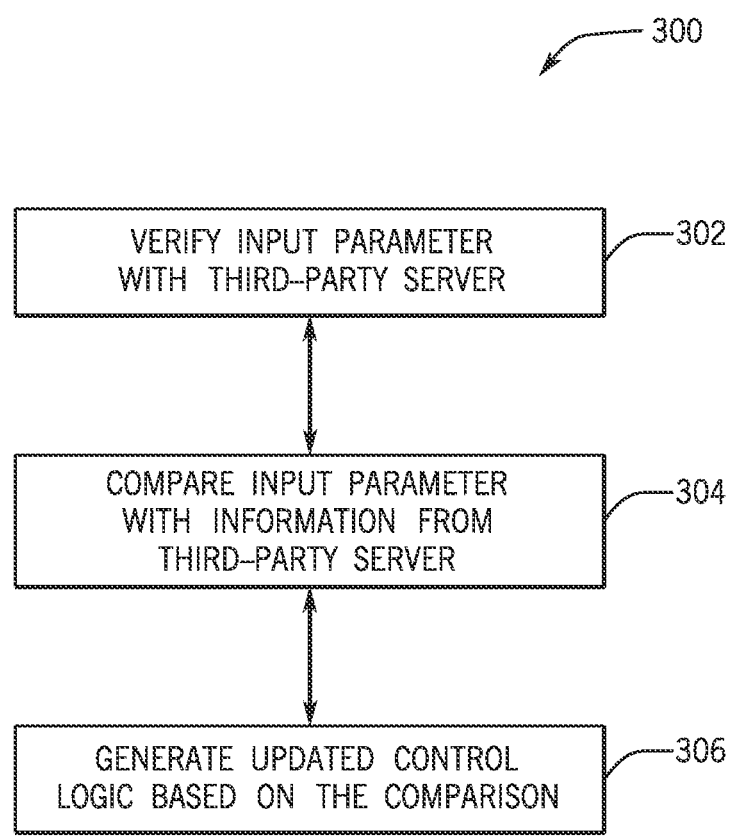
FIG. 3 is a flow diagram of an exemplary method for remote control of a hydrogen filling station including verifying input parameters according to an exemplary embodiment.

Referring now to FIG. 2, an exemplary method for remote control of a hydrogen filling station according to an exemplary embodiment will be described. FIG. 3 will be described with reference to the components of FIGS. 1 and 2. At block 202, the method includes providing a remote server operatively connected for computer communication via a communication network to a programmable logic controller (PLC). The PLC is configured to execute a control logic at the hydrogen filling station to control vehicle fueling. As discussed above with FIG. 1, the remote server 104 is operatively connected for computer communication via the communication network 106 to the PLC 114. The PLC 114 executes the control logic 116 at the hydrogen filling station 102 to control vehicle fueling, for example, control fueling of the vehicle 110.

Referring again to FIG. 2, at block 204, the method includes receiving at least one input parameter from the PLC at the remote server. For example, the PLC 114 can transmit at least one input parameter to the remote server 104 via, for example, the communication interface 124 and the communication network 106. The remote server 104 can receive the at least one input parameter via the communication network 106 and the communication interface 136.

Input parameters as discussed herein can include measured values and/or parameters associated with a tank system (e.g., the vehicle) receiving fuel and the hydrogen filling station supplying the fuel. For example, measured values and/or parameters associated with the vehicle 110 can include, but are not limited to, initial gas temperature, initial gas pressure, tank system type, tank system characteristics, and state of charge. Measured values and/or parameters can also be transmitted and/or received from sensors provided by the hydrogen filling station. For example, the plurality of sensors 126 can provide measured values associated with a tank system of the vehicle 110 receiving fuel and the hydrogen filling station 102 supplying the fuel. These measured values, can include, for example, pressure, temperature, and ambient temperature, gas delivered gas temperature, among others. Further, the input parameters can include parameters associated with the hydrogen filling station 102, the PLC 114, and the control logic 116. For example, a station type, current versions of the control logic 116 (e.g., methods, algorithms, protocols), among others.

Referring again to FIG. 2, at block 206, the method includes generating by a processor at the remote server an updated control logic based on at least the input parameter. As discussed above with FIG. 1, the remote server 104 can include a processor 134. The processor 134 can generate an updated control logic based at least in part on the input parameter. For example, based on the input parameter, the processor 134 can generate an updated control logic including updated parameters (i.e., output parameters) for controlling the fueling of the vehicle 110 (i.e., refueling control implemented by the control logic 116). For example, ending pressure, refueling gas flow rate, Average Pressure Ramp Rate (APRR), stop fill rate, and other logics to control operation of the hydrogen filling station 102 and fueling of the vehicle 110. In further embodiments, the updated control logic and/or output parameters include updated protocols (e.g., SAE look-up tables) for controlling vehicle fueling. Further, in some embodiments, which will be discussed in further detail herein, information from the third-party server 108 can be used to generate the updated control logic and/or output parameters, validate and/or cross-check input parameters.

Referring again to FIG. 3, the method includes at block 208, transmitting the updated control logic to the PLC for execution by the PLC at the hydrogen filling station to control vehicle fueling. For example, the remote server 104 via the communication network 106 can transmit the updated control logic to the PLC 114. The PLC 114 can, in some embodiments, replace and/or update the control logic 116 with the updated control logic. In some embodiments, output parameters are transmitted from the remote server 104 to the PLC 114. The PLC 114 can update the control logic 116 with the output parameters. It is understood that in some embodiments, data redundancy can be implemented by the PLC 114. For example, the control logic 116 can be stored in separate places (e.g., the memory 120, the data store 122). Further, backup versions of the control logic 116 prior to update can be stored.

Referring now to FIG. 3, an exemplary method for remote control of a hydrogen filling station including verifying input parameters according to an exemplary embodiment will be described. The method 300 of FIG. 3 will be described with reference to the components of FIGS. 1 and 2. As discussed above, in some embodiments, the updated control logic generated by the remote server 104 can be based on the input parameter and information received from the third-party server 108. For example, generating by the processor at the remote server the updated control logic (e.g., block 206), can include at block 302, verifying at least the input parameter with the information received from the third-party server, wherein the updated control logic is based on the verification.

As an illustrative example, input parameters transmitted from the hydrogen filling station 102 can include input parameters from the vehicle 110, for example, an initial gas temperature, and initial gas pressure, and input parameters from the hydrogen filling station 102, including ambient temperature and delivered gas temperature. These input parameters are received by the remote server 104. The remote server 104 can transmit these input parameters to the third-party server 108 for verification with, for example, a current protocol stored at the remote server 104. For example, the input parameters can be verified with a current SAE look-up table stored at the third-party server 108. The third-party server 108 can retrieve output parameters based on the input parameters and the verification, for example, ending pressure, and refueling gas flow rate. The output parameters can be transmitted to the remote server 104 where the remote server can generate an updated control logic based on the output parameters.

At block 304, verification at block 302 can include comparing the at least one input parameter to information stored at the third-party server and generating by the processor the updated control logic based on the comparison. Accordingly, in one embodiment, verifying the at least one input parameter to information stored at the third-party server includes verifying the at least one input parameter with the information stored at the third-party server. At block 306, the method includes generating the updated control logic based on the comparison (e.g., at block 302). As discussed above at block 208 in FIG. 2, the updated control logic can then be transmitted to the PLC 114.

As an illustrative example, input parameters transmitted from the hydrogen filling station 102 can include the control logic 116. The input parameters and/or the control logic 116 can also include an SAE look-up table and/or the SAE look-up table version or date last updated. In one embodiment, the remote server can receive from the third-party server 108 a current version and/or date last updated of an SAE look-up table stored at the third-party server 108. The remote server 104 can compare the current version and/or date last updated to the SAE look-up table version or date last updated received from the hydrogen filling station 102. If the SAE look-up table version or date last updated received from the hydrogen filling station 102 is older than the current version and/or date last updated from the third-party server 108, the remote server 104 can generate an updated control logic based on the SAE look-up table from the third-party server 108. In another embodiment, the remote server 104 could simply transmit the updated SAE look-up table from the third-party server 108 to the hydrogen filling station 102.

Figure 4:
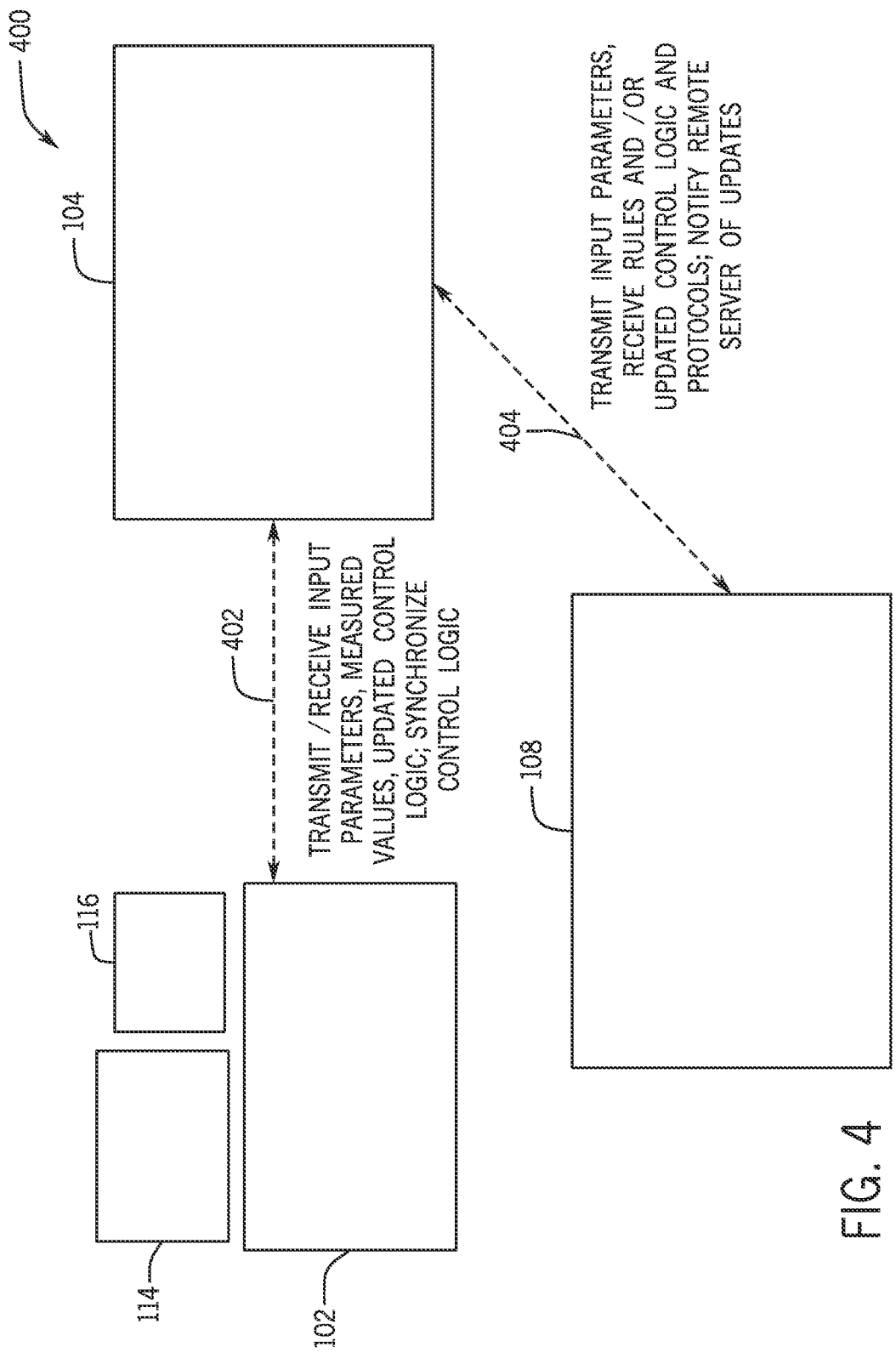
FIG. 4 is a schematic block diagram illustrating an exemplary process for remote control of a hydrogen filling station according to an exemplary embodiment.

Referring now to FIG. 4 an exemplary process, including transmission and receipt of data, for remote control of a hydrogen filling station according to an exemplary embodiment will be discussed. FIG. 4 will be described with reference to the components of FIGS. 1, 2 and 3. For simplicity, a simplified view of the components of FIG. 1 is shown in FIG. 4. Like numbers represent like elements in FIG. 1. Further, it is understood that FIG. 4 can include some or all of the components and functionality of FIG. 1.

Similar to FIG. 1, FIG. 4 includes the hydrogen filling station 102 having the PLC 114 and the control logic 116. Further, FIG. 4 includes the remote server 104 and the third-party server 108. As discussed above with FIG. 1, the components of FIG. 4 can be operatively connected for computer communication via, for example, a communication network (see FIG. 1). The data links 402 and 404 represent exemplary communication between the components of FIG. 4. The examples provided herein are exemplary in nature and other types of communication, transmission and receipt of other inputs and parameters can be implemented.

With reference to data link 402 between the hydrogen filling station 102 and the remote server 104, several different input and output parameters can be communicated in accordance the systems and methods discussed herein. For example, the hydrogen filling station 102 can transmit an input parameter (e.g., measured values, current fueling methods, algorithms, protocols) to the remote server 104. Based on the input parameters received by the remote server 104, the remote server can generated updated control logic and/or updated output parameters. In some embodiments, the control logic 116 can be synchronized with a control logic (not shown) stored at the remote server 104. Synchronization can occur on a periodic basis. This can provide data redundancy of the control logic and storage of different versions of the control logic. Thus, the remote server 104 can be aware of the current version of the control logic 116 and/or other input parameters implemented in the control logic 116. In some embodiments, the remote server 104 could provide an archive of different versions of the control logic 116.

With reference to data link 404 between the remote server 104 and the third-party server 108, verification and/or cross-checking can be performed based in part on the input parameters received by the remote server 104. For example, an input parameter can be compared to a rules set (not shown) at the third-party server 108 and/or current fueling methods, algorithms and protocols to determine if the input parameter and/or control logic 116 needs to be updated. In another embodiment, the third-party server 108 can transmit information to the remote server 104 indicating that one or more parameters of the control logic 116 (e.g., current fueling methods, algorithms and protocols) needs to be updated.

For example, the third-party server 108 can be updated with a new version of SAE TIR J2601 protocols. The third-party server 108 can initiate transmission of the updated protocol to the remote server 104 and notify the remote server 104 of the update. Accordingly, the remote server 104 can generate an updated control logic based on the updated protocol and transmit the updated control logic to the PLC 114. In another embodiment, the remote server 104 can store the updated protocol and request and/or receive from the hydrogen filling station the control logic 116. If the control logic 116 does not match the updated protocol stored at the remote server 104, the remote server 104 can generate an updated control logic based on the updated protocol and transmit the updated control logic to the PLC 114. Accordingly, maintenance of programming, standards and methods of the PLC 114 can be maintained accurately.

The embodiments discussed herein may also be described and implemented in the context of non-transitory computer-readable medium storing computer-executable instructions, as discussed above. Further, it will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for remote control of a hydrogen filling station, comprising:

providing a remote server located remotely from the hydrogen filling station, wherein the remote server is operatively connected for computer communication via a communication network to a programmable logic controller (PLC) of the hydrogen filling station, and wherein the PLC is configured to execute a control logic at the hydrogen filling station to control vehicle fueling of a vehicle connected to the hydrogen filling station via a fueling interface;

receiving at least one input parameter from the PLC at the remote server, wherein the input parameter includes a station type of the hydrogen filling station and a tank system type of the vehicle connected to the hydrogen filling station;

generating, by a processor at the remote server, an updated control logic based on at least the input parameter;

transmitting the updated control logic to the PLC; and providing fuel to the vehicle, according to the PLC, via the fueling interface at the hydrogen filling station according to the updated control logic.

2. The computer-implemented method of claim 1, wherein the remote server is operably connected for computer communication to a third-party server, and including receiving, over the communication network, information from the third-party server associated with the input parameter from the PLC, and the generating, by the processor of the remote server, the updated control logic is based on the input parameter from the PLC and the information received from the third-party server.

3. The computer-implemented method of claim 2, wherein generating by the processor at the remote server the updated control logic includes verifying the input parameter with the information received from the third-party server, wherein the updated control logic is based on the verification.

4. The computer-implemented method of claim 1, wherein generating by the processor at the remote server the updated control logic includes generating an output parameter based on the input parameter and information stored at a third-party server.

5. The computer-implemented method of claim 1, wherein the input parameter includes measured values associated with a tank system of the vehicle receiving fuel and the hydrogen filling station supplying the fuel.

6. The computer-implemented method of claim 5, wherein the measured values are received from sensors provided by the hydrogen filling station.

7. The computer-implemented method of claim 1, wherein the updated control logic includes output parameters for controlling the vehicle fueling.

8. The computer-implemented method of claim 1, wherein the updated control logic includes updated protocols for controlling the vehicle fueling.

9. A cloud computing-based system, comprising:
a hydrogen filling station transmitting at least one input parameter to a remote server located remotely from the hydrogen filling station via a communication network, the hydrogen filling station including a programmable logic controller (PLC) for executing a control logic stored at the PLC to control fueling of a vehicle, wherein the input parameter includes a station type of the hydrogen filling station and a tank system type of the vehicle connected to the hydrogen filling station; and
the remote server, including a processor, receiving the at least one input parameter and generating by the processor an updated control logic based on the at least one input parameter, the remote server transmitting the updated control logic to the hydrogen filling station, wherein the PLC replaces the control logic with the updated control logic for execution by the PLC to control the hydrogen filling station to provide fuel to the vehicle; and
wherein the hydrogen filling station controls fueling of the vehicle according to the updated control logic.

10. The system of claim 9, including a third-party server operatively connected for computer communication to the remote server via the communication network, wherein generating by the processor the updated control logic includes comparing the at least one input parameter to information stored at the third-party server and generating by the processor the updated control logic based on the comparison.

11. The system of claim 9, wherein the at least one input parameter includes measured values received by the PLC from sensors provided by the hydrogen filling station.

12. The system of claim 9, wherein generating by the processor the updated control logic includes determining protocols to control fueling of the vehicle based on the at least one input parameter.

13. A hydrogen filling station for fueling a vehicle operably connected to the hydrogen filling station by a fueling interface, comprising:
a programmable logic controller (PLC) storing a control logic, wherein the PLC executes the control logic to control fueling of the vehicle;
a plurality of sensors providing measured values associated with a tank system of the vehicle receiving fuel and the hydrogen filling station supplying the fuel, the PLC transmitting at least one of the measured values and a station type of the hydrogen filling station and a tank system type of the vehicle connected to the hydrogen filling station to a remote server located remotely from the hydrogen filling station using a communication network; and
the PLC receiving at least one output parameter over the communication network from the remote server, updating the control logic stored at the PLC with the at least one output parameter, and fueling of the vehicle by executing the updated control logic.

14. The hydrogen filling station of claim 13, wherein the at least one output parameter from the remote server is determined by validating the at least one of the measured values with information received from a third-party server.

15. The hydrogen filling station of claim 14, wherein the at least one output parameter from the remote server is determined by applying a rules set provided by the third-party server to the at least one of the measured values.

16. The hydrogen filling station of claim 13, wherein the at least one output parameter includes a hydrogen fueling vehicle protocol to control fueling of the vehicle based on the at least one of the measured values.

17. The hydrogen filling station of claim 13, wherein the at least one output parameter includes updated control logic to control fueling of the vehicle based on the at least one of the measured values.

* * * * *